M. HALL.
Potato-Digger.
No. 64,097.  Patented Apr. 23, 1867.
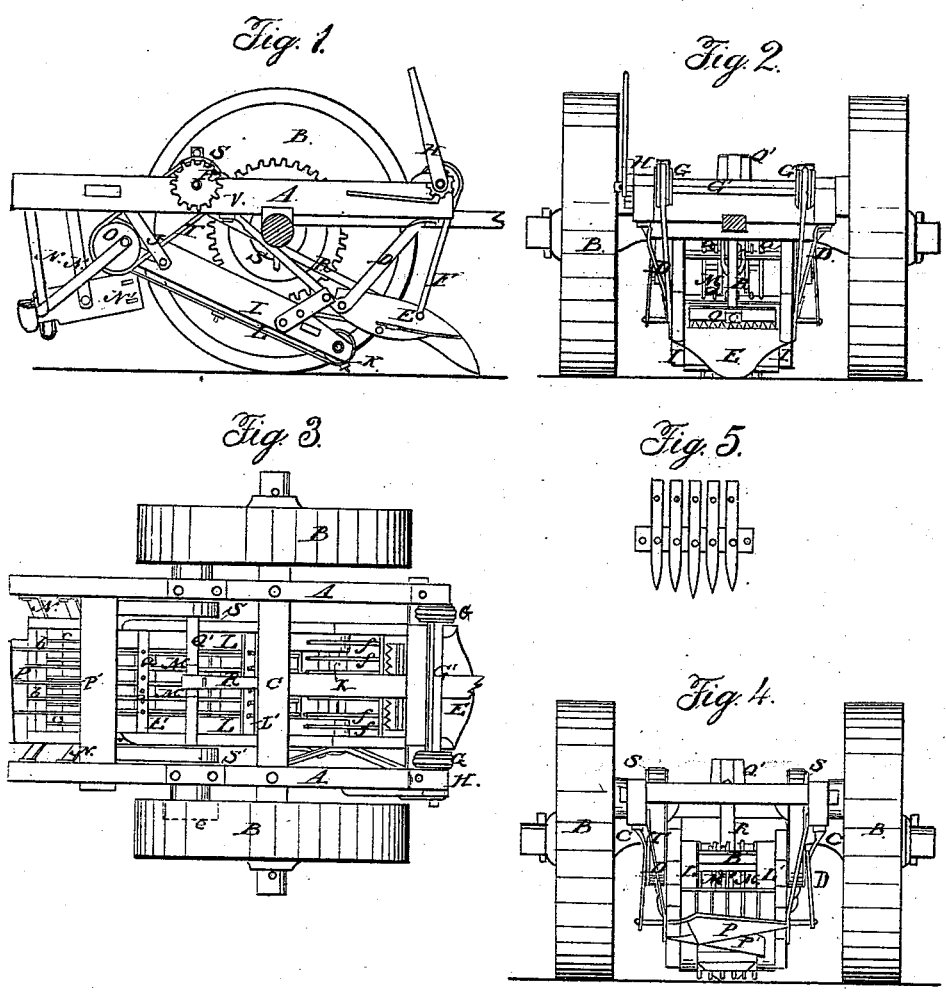
Witnesses.
W. H. Brundage
Frank Alden
Inventor.
Manby Hall

United States Patent Office.

MANLEY HALL, OF LIVONIA, MICHIGAN.

Letters Patent No. 64,097, dated April 23, 1867.

---

IMPROVEMENT IN POTATO-DIGGERS.

---

The Schedule referred to in these Letters Patent and making part of the same.

---

TO ALL WHOM IT MAY CONCERN:

Be it known that I, MANLEY HALL, of Livonia, in the county of Wayne, and State of Michigan, have invented certain new and useful improvements in Potato-Diggers; and I do hereby declare that the following is a full and complete description of the same, reference being had to the accompanying drawings, making a part of this specification, in which—

Figure 1 is a side view of the digger with one wheel detached.
Figure 2 is a view of the front end.
Figure 3 is a top view.
Figure 4 is a view of the rear end.
Figure 5 is a detached section.

Like letters of reference refer to like parts in the different views.

The carriage of this apparatus consists of a rectangular frame, A, fig. 1, mounted upon the wheels and axle B C, in which are arranged the following-described parts of the machine:

D D, fig. 1, are a pair of dependent stay-braces, secured to the under side of the frame. To the lower angle of these stays is pivoted the scoop E, which allows to it a vertical vibratory action. The lip or front of this scoop is suspended by the ropes F, fig. 1, the upper end being attached to the pulleys G, which are rotated by the shaft G′ by means of the ratchet and pawl-lever H. I, fig. 1, is a supplementary frame, the lower end of which is secured to the stay D and the upper end to the cross-tie of the frame A by means of the straps J. At each end of this supplementary frame are rollers K, placed close to the frame upon the shafts K′, which have their bearings in said frame. Over these rollers revolve a pair of endless belts, L, which are connected to each other by cross-ties L′, in which are arranged a row of short, rigid teeth, $a$. These belts and cross-ties together constitute a carrier or elevator, J′, the purpose of which will hereafter be shown. M M, fig. 3, are parallel bars, placed between the belts, and upon which the upper side of the elevator slides in its revolutions. To the rear end of the frame A is suspended loosely by the links N a sieve, N′, to which is given a reciprocating movement by the wheel O, connected to the same by the link O′. This sieve is provided with a double set of wires, $b$ and $c$, fig. 3, one above the other, the upper one having the longest wires, some of which, it will be seen, reach the extreme end of the machine, and thus passing quite across the top of the conductor or chute P, whereas the wires of the lower sieve reach only to the inner edge of the conductor P′. Q, fig. 2, is a rake, fitted to and operating within the sides of the scoop E. This rake is operated in a right line with the machine by the crank-shaft Q′, to which it is connected by the pitman R, and which shaft is driven by the pinion R′, fig. 1, also indicated by the dotted lines $e$, fig. 3. This pinion is engaged with the wheel S, secured to the inside of the wheels B, by which the machine is driven. On the ends of the crank-shaft referred to are the pulleys, S′, fig. 4, by which the shaft K is driven by the belt T and pulley O, and by which the elevator referred to is driven, also the sieve N′.

Having thus indicated the construction and arrangement of the digger, the practical operation of the same is as follows:

The machine is placed over the row of potatoes so that the wheels B shall be on each side of it. The lip of the scoop is then lowered to the ground by the lever and ratchet-wheel referred to. As the machine moves forward the scoop is drawn into the ground under the potatoes, which are then raked back into the grating or sieve $f$, fig. 3, through which the loose dirt falls to the ground, and from which the potatoes are raked on to the bars M by the short, rigid teeth $a$, and carried up said bars to the sieve N′, into which they drop, and all the remaining dirt and small potatoes sifted out by the short, energetic vibrations of the sieve in the manner as described. Weeds or large pieces of dirt, or stones which could not pass through the several sieves and grates, are carried over the end of the machine or sieve N′ to the ground, while the potatoes fall through into the conductors P and are carried by them to each side of the row and dropped upon the ground or into baskets provided for that purpose. The rake, after being drawn back, is elevated on its return by the staple V, through which the pitman plays, and which acts as a fulcrum on which the pitman or rake is lifted by the downward movement of the crank, to which it is connected and operated. By thus lifting the rake it allows the potatoes to remain on the scoop to be drawn back upon the grating, as before described. This digger can be moved backward without operating the machinery, as the spur-wheel or pinion referred to is provided with a ratchet-wheel and pawl which operates only as the machine moves forward, but slips over the ratchet on backing; hence any backward movement of the machine cannot in any way disturb or endanger the machinery. Fig. 4 may be used in place of the scoop E should the ground be hard and unyielding to the lip of the scoop, and the work of digging proceeded with as above. By means of the pawl and ratchet H the scoop may be raised entirely from the ground, and in this position the machine can be moved from place to place without danger to the machinery, and with little trouble.

What I claim as my improvement, and desire to secure by Letters Patent, is—

1. The scoop E, grating $f$, and bars M, as arranged in combination with the elevator, as constructed of the belts L and cross-ties L', armed with teeth $a$, and the rake Q, for the purpose and in the manner substantially as set forth.

2. The sieve N, conductors P P', when arranged and operated conjointly in combination with the elevator and rake Q and scoop E, as and for the purpose substantially as herein described.

MANLEY HALL.

Witnesses:
W. H. BURRIDGE,
FRANK ALDEN.